US011233767B1

(12) United States Patent
Eland et al.

(10) Patent No.: US 11,233,767 B1
(45) Date of Patent: Jan. 25, 2022

(54) SYSTEM AND METHOD FOR PUBLISHING DNS RECORDS OF A DOMAIN INCLUDING EITHER SIGNED OR UNSIGNED RECORDS

(71) Applicant: Afilias Limited, Dublin (IE)

(72) Inventors: Howard Eland, Horsham, PA (US); James Galvin, Horsham, PA (US)

(73) Assignee: AFILIAS LIMITED, Dublin (IE)

( * ) Notice: Subject to any disclaimer, the term of this patent is extended or adjusted under 35 U.S.C. 154(b) by 0 days.

(21) Appl. No.: 16/920,076

(22) Filed: Jul. 2, 2020

(51) Int. Cl.
*H04L 12/00* (2006.01)
*H04L 29/12* (2006.01)
*H04L 29/06* (2006.01)

(52) U.S. Cl.
CPC ...... *H04L 61/2076* (2013.01); *H04L 61/1511* (2013.01); *H04L 61/2046* (2013.01); *H04L 61/2053* (2013.01); *H04L 61/3005* (2013.01); *H04L 63/062* (2013.01); *H04L 63/0823* (2013.01)

(58) Field of Classification Search
CPC ............. H04L 63/1416; H04L 41/0213; H04L 9/0825; H04L 9/3247
USPC .................................................. 709/245, 249
See application file for complete search history.

(56) References Cited

U.S. PATENT DOCUMENTS

| | | | | |
|---|---|---|---|---|
| 7,725,602 B2 * | 5/2010 | Liu | ........................ | H04L 67/06 709/245 |
| 7,761,566 B2 * | 7/2010 | Adelman | ............. | G06Q 10/107 709/224 |
| 7,788,484 B2 * | 8/2010 | Paya | ....................... | H04L 51/00 713/156 |
| 7,970,858 B2 * | 6/2011 | Adelman | ............ | G06F 16/9535 709/217 |
| 8,447,856 B2 * | 5/2013 | Drako | ................. | H04L 61/1511 709/225 |

(Continued)

*Primary Examiner* — Frantz Coby
(74) *Attorney, Agent, or Firm* — Haynes and Boone, LLP

(57) ABSTRACT

A system for publishing a plurality of Domain Name System (DNS) records for a domain name, the system comprising: a record selection module for obtaining selected data of registry data associated with the domain name in a registry database; a DNS Security (DNSSEC) signing system having at least one signing module for digitally signing the selected data of the registry data, the digitally signing using one or more signing keys (SK) to generate a signed DNS record, the one or more signing keys associated with the registry data of the domain name; a distribution system for coordinating the publishing of a set of DNS records in the DNS by facilitating transmitting of the set of DNS records to one or more authoritative servers of the DNS in a transmission path that bypasses storing of the signed DNS record in the registry database, the set of DNS records generated based on a signing identifier on how to generate the set of DNS records by either: a) sending the selected data to the DNSSEC signing system for subsequent direct inclusion as the signed DNS record in the set of DNS records by the DNSSEC signing system using a set of generation instructions; or b) including the selected data as an unsigned DNS record in the set of DNS records by the distribution system using the set of generation instructions, wherein the transmission path also bypasses the at least one signing module of the DNSSEC signing system.

24 Claims, 5 Drawing Sheets

(56) References Cited

U.S. PATENT DOCUMENTS

| | | | | |
|---|---|---|---|---|
| 8,583,806 B2* | 11/2013 | Fleischman | ......... | H04L 61/1511 |
| | | | | 709/227 |
| 9,015,263 B2* | 4/2015 | Styler | ..................... | G06F 21/50 |
| | | | | 709/206 |
| 9,130,917 B2 | 9/2015 | Smith et al. | | |
| 9,479,422 B2 | 10/2016 | Sundaresan et al. | | |
| 9,722,970 B2 | 8/2017 | Prince et al. | | |
| 9,749,307 B2 | 8/2017 | Smith et al. | | |
| 9,992,156 B2* | 6/2018 | Tan | ..................... | H04L 63/1416 |
| 10,097,504 B2 | 10/2018 | Backholm | | |
| 10,158,620 B2 | 12/2018 | Smith et al. | | |
| 2006/0200487 A1* | 9/2006 | Adelman | ............. | G06Q 10/107 |
| 2007/0067465 A1* | 3/2007 | Blinn | .................. | H04L 41/0893 |
| | | | | 709/229 |
| 2007/0204038 A1* | 8/2007 | Majumdar | .......... | H04L 61/1552 |
| | | | | 709/225 |
| 2008/0022013 A1* | 1/2008 | Adelman | .......... | H04L 29/12132 |
| | | | | 709/245 |
| 2009/0216904 A1* | 8/2009 | Adelman | ............. | G06Q 10/107 |
| | | | | 709/245 |
| 2010/0011420 A1* | 1/2010 | Drako | .................... | H04L 51/12 |
| | | | | 726/5 |
| 2012/0022942 A1* | 1/2012 | Holloway | ........... | H04L 63/1433 |
| | | | | 705/14.49 |
| 2012/0254386 A1* | 10/2012 | Smith | ................. | H04L 61/1511 |
| | | | | 709/223 |
| 2013/0318602 A1* | 11/2013 | Devarapalli | ........ | H04L 67/1002 |
| | | | | 726/22 |
| 2017/0163425 A1* | 6/2017 | Kaliski, Jr. | ........... | H04L 9/3247 |
| 2020/0084178 A1* | 3/2020 | Dreyer | ................ | H04L 41/0213 |
| 2021/0067377 A1* | 3/2021 | Beck | ..................... | H04L 9/0825 |

* cited by examiner

SYSTEM AND METHOD FOR PUBLISHING DNS RECORDS OF A DOMAIN INCLUDING EITHER SIGNED OR UNSIGNED RECORDS

FIELD

The present invention is related to DNS security systems and methods.

BACKGROUND

The Domain Name System (DNS) is the part of the Internet infrastructure that translates human-readable domain names into the Internet Protocol (IP) numbers needed to establish IP communications over the Internet, for example TCP and UDP. That is, DNS allows users to refer to web sites, and other resources, using easier to remember domain names, such as "www.a.b.org," rather than the numeric IP addresses, which are machine readable addresses used by software to communicate with computers on the Internet. It should be noted that a single IP address, e.g., one assigned to a single server, can support numerous domain names. That is, different domain names may resolve to the same server, that can then determine what content to provide based on the requested domain name and/or additional non-domain information.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows, in part, for users to be directed to a desired domain by a lookup process whereby the user enters the desired domain, and the DNS returns appropriate IP addresses. During the DNS resolution process, a request for a given domain name is routed from a resolver (e.g. a stub resolver) to an appropriate server (e.g. a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers.

Although the distributed nature of the DNS provides significant advantages in terms of the efficiency of the overall system it also makes the system vulnerable to certain types of malfunctions and/or attacks at various nodes in the system. One particular problem that can occur is referred to as DNS cache poisoning. DNS cache poisoning occurs when data is introduced into a DNS name server's cache database that did not originate from authoritative DNS sources. This may result from deliberate attacks on a name server, or it may be an unintended result of, for example, a misconfigured DNS cache or improper software design of a DNS applications. Thus, DNS cache poisoning can result in (1) resolution requests failing, such as when inaccurate or misconfigured IP address information is provided, or (2) a requesting user's resolution request being directed to a malicious site that spoofs the genuine domain and is used to illicitly obtain information such as account passwords, or to distribute malicious content, such as computer worms or viruses, that are delivered to the requesting user.

The Domain Name System Security Extensions (DNSSEC) is a suite of Internet Engineering Task Force (IETF) specifications for securing certain kinds of information provided by the DNS as used on IP networks. DNSSEC provides for the signing of DNSSEC-ready zones, ensuring origin authentication and data integrity for DNS data, as well as authenticated denial of existence. In general, answers provided within DNSSEC are digitally signed, and, by checking the digital signature, a DNS resolver is able to check if the information corresponds to the information on the authoritative DNS server. DNSSEC uses public-key cryptography for the digital signatures and authentication. The DNSKEY record is authenticated via a chain of trust, starting with a set of verified public keys for the DNS root zone, which is maintained by a trusted third party.

To implement DNSSEC, several new DNS record types were created or adapted to use with DNSSEC, including RRSIG, DNSKEY, DS, NSEC, NSEC3 and NSEC3PARAM. For example, when DNSSEC is used, each authoritative answer to a DNS lookup will contain an RRSIG DNS record in addition to the record type that was requested. The RRSIG record is a digital signature of the answer DNS resource record set. The digital signature can be verified by locating the correct public key found in a DNSKEY record. The DS record is used in the authentication of DNSKEYs in the lookup procedure using the chain of trust. NSEC and NSEC3 records are used to provide the authenticated denial of existence responses for DNS records that do not exist. The requirements of DNSSEC involve the use of different keys, stored both in DNSKEY records and from other sources to form trust anchors. There are, for example, Key Signing Keys (KSKs), which are used to sign other DNSKEY records, and Zone Signing Keys (ZSKs), which are used to sign other records. Because the ZSKs are under the control and use of a specific DNS zone, they can be switched more easily and more often. As a result, ZSKs can generally be much shorter (in terms of byte length) than KSKs, while still offering an acceptable level of protection.

However, with the introduction of DNSSEC into vast registries, such as the .org registry, inefficiencies in the various signing techniques for DNSSEC data, particularly with respect to large zones, bring the potential for resolution problems including delays and resolution failures. Such problems can have significant detrimental effects on e-commerce and other high-traffic sites. Further, the ability to properly utilize storage, connection and/or computing resources of DNS components for publication of DNS records in the DNS is considered suboptimal in today's DNS environment.

SUMMARY

One advantage of the present invention is that it can provide a system and/or method to obviate or mitigate at least one of the above presented disadvantages.

A first aspect provided is a system for publishing a plurality of Domain Name System (DNS) records for a domain name, the system comprising: a record selection module for obtaining selected data of registry data associated with the domain name in a registry database; a DNS Security (DNSSEC) signing system having at least one signing module for digitally signing the selected data of the registry data, the digitally signing using one or more signing keys (SK) to generate a signed DNS record, the one or more signing keys associated with the registry data of the domain name; a distribution system for coordinating the publishing of a set of DNS records in the DNS by facilitating transmitting of the set of DNS records to one or more authoritative servers of the DNS in a transmission path that bypasses storing of the signed DNS record in the registry database, the set of DNS records generated based on a signing identifier on how to generate the set of DNS records by either: a) sending the selected data to the DNSSEC signing system for subsequent direct inclusion as the signed DNS record in the set of DNS records by the DNSSEC signing system using a set of generation instructions; or b) including the selected data as an unsigned DNS record in the set of DNS records by the distribution system using the set of generation instructions, wherein the transmission path also bypasses the at least one signing module of the DNSSEC signing system.

A second aspect provided is a method for publishing a plurality of Domain Name System (DNS) records for a domain name, the method comprising the steps of: obtaining selected data of registry data associated with the domain name in a registry database; using at least one signing module for digitally signing the selected data of the registry data, the digitally signing using one or more signing keys (SK) to generate a signed DNS record, the one or more signing keys associated with the registry data of the domain name; coordinating the publishing of a set of DNS records in the DNS by facilitating transmitting of the set of DNS records to one or more authoritative servers of the DNS in a transmission path that bypasses storing of the signed DNS record in the registry database, the set of DNS records generated based on a signing identifier on how to generate the set of DNS records by either: a) sending the selected data to the DNSSEC signing system for subsequent direct inclusion as the signed DNS record in the set of DNS records by the DNSSEC signing system using a set of generation instructions; or b) including the selected data as an unsigned DNS record in the set of DNS records by the distribution system using the set of generation instructions, wherein the transmission path also bypasses the at least one signing module of the DNSSEC signing system.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Figure 1:
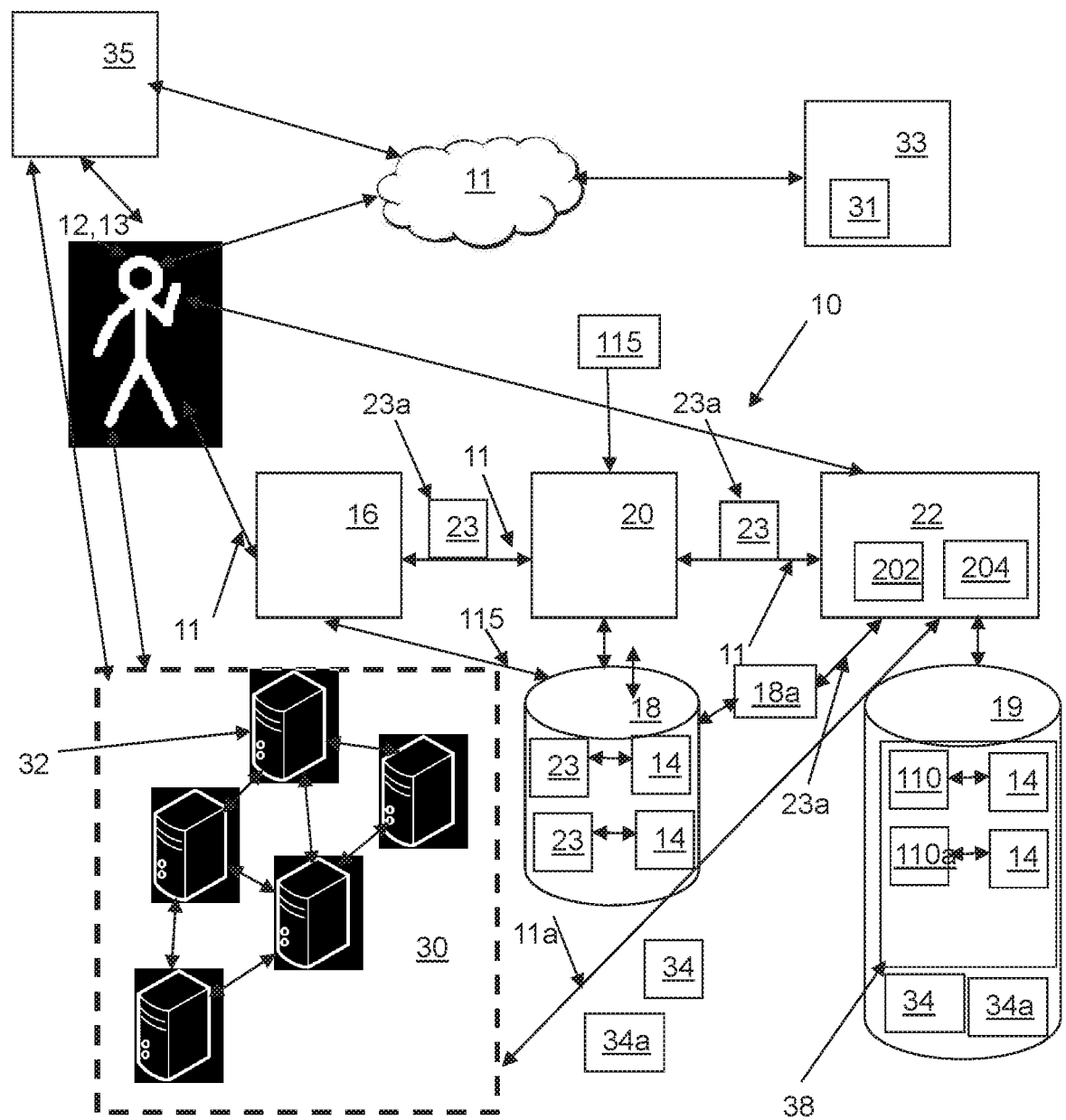
FIG. 1 is a block diagram of components of a DNS publication system.

Referring to FIG. 1, shown is a Domain Name System (DNS) publication system 10 for coordinating and publishing DNS records (e.g. DNS data 34 including one or more Resource Record sets—RR sets) in a DNS 30 containing DNS servers 32 (e.g. Authoritative servers). As further described below, the DNS servers 32 provide DNS services for users 13 of network 11 (e.g. Internet) resources 31 (e.g. as provided by a plurality of distributed web servers 33, mail servers 33, etc., as coordinated through various domain names 14 of the network 11). It is recognized that network resources 31 can be provided by one or more registry operators 20 (e.g. via registry databases 18), including external links to mail servers and/or other websites based on web page return results. The distributed servers 33 can rely upon one or more resolver servers 35, by which the network user 13 ultimately accesses network resources 31 via the DNS 30.

It is recognized, as further described below, that the DNS data 34 is considered an "unsigned" version of the DNS record(s) 26 (see FIG. 2) the DNS data 34 contains and the DNS data 34a is considered a "signed" version of the DNS record(s) 26 the DNS data 34a contains, such that the DNS data 34a contains signed DNS records 26 that are absent from the DNS data 34. One example of the unsigned DNS data 34 is for an unsigned zone (i.e. containing no DNSSEC related DNS records 26) while the signed DNS data 34a contains one or more DNSSEC related records 26) according to DNSSEC protocol (e.g. DNSSEC related generation instructions 105a—see FIG. 3).

The DNS publication system 10 can be utilized by a registrant 12 (e.g. user 13), either directly or via the registrar 16 for example, to publish the DNS data 34 (e.g. signed or unsigned DNS records—see FIG. 2) associated with the domain name(s) 14 owned by the registrant 12. As further described below, the DNS data 34 is published (e.g. distributed to the various DNS servers 32) via a DNS publication service 22 (see FIG. 3), also referred to as a registry service provider 22. Also as further described below, the DNS publication service 22 is configured to facilitate the sending of signed DNS data 34 and/or unsigned DNS data 34 to the DNS 30, depending upon the configuration (e.g. using a signing identifier 110) of the domain name 14 of the registrant 12. It is recognized that the DNS publication service 22 is responsible for creating/maintaining the DNS data 34 resident on the DNS servers 32, such that the DNS data 34 requires consistent updating/changing depending upon Registry object 23 changes (e.g. updates/creations/deletions/modifications) affecting data pertinent to DNS resource records 26, as performed by the registry operator 20 during operation/maintenance of the domain names 14 of the registry database 18. It is recognized that the registry database 18 contains registry objects 23 (including contact objects 23, host objects 23, and other domain objects 23—e.g. such as registrant name, domain renewal date, domain creation date) amongst other registry data pertinent to the creation and maintaining of the respective domain name(s) 14, including data relevant to resource records 26 used to populate the DNS data 34 (as generated by the DNS publication service 22).

An advantage of utilizing the DNS publication service 22 to decidedly (via the signing identifier 101) generate either signed or unsigned DNS data 34 is where a plurality of different registrants 12 use the same DNS publication service 22, such that some of the domain names 14 can be operated as signed domain(s) and some can be operated as unsigned domain(s). This distinction between signed and unsigned domains can be appreciated by the same registrant 12, who may have some domain names 14 operating as signed domains and some domain names 14 operating as unsigned domains. In either case, the same DNS publication service 22, and associated infrastructure of DNS servers 32

(associated with the respective DNS publication service 22), can be utilized by the registrants 12 both for signed and unsigned domains. As such, advantageously the DNS publication service 22 can be flexibly operated, in parallel, for both for unsigned DNS operation of domains as well as simultaneously for signed DNS operation of domains. It is recognized that for unsigned domains, the DNS data 34 generated by the DNS publication system 22 consists of only unsigned DNS records. In terms of signed domains, the DNS data 34 generated by the DNS publication system 28 will contain at least a portion, if not all, signed DNS records.

For example, the DNS publication service 22 could have an identifier table 38 (stored in a publication database 19), providing the signing identifier 110 (e.g. signed or unsigned) associated with each of the domain names 14 (and the record types 26c of the domain names 14). Further, it is recognized that the DNS publication service 22 is responsible for receiving the registry data 23 of the domain name 14 (e.g. as obtained from the domain name registry 18 database) and then using the obtained registry data 23 to generate the resource record(s) 26 of the DNS data 34. The DNS data 34 can then be transmitted directly to the DNS 30 (i.e. published to the DNS servers 32) in a network transmission path 11a that bypasses the domain name registry 18 database. In other words, the generated DNS data 34 is not returned to or otherwise stored in the domain name registry 18 database, once generated. Rather, the generated DNS data 34 is sent by the DNS publication service 22 directly over the network path 11a to the plurality of DNS servers 32 associated with the domain name 14 (e.g. as administered by the DNS publication service 22). Therefore, it is recognized that each time that new DNS data 34 is to be generated, the associated registry data 23 (pertaining to the resource record(s) 26) is obtained by the DNS publication service 22 for use in generating and then transmitting of the resultant DNS data 34 over the transmission path 11a.

Accordingly, as noted herein, the generated resource records 26 and resultant DNS data 34 are not stored in the registry database 18, rather the DNS data 34 (containing the signed/unsigned resource records 26 for use in implementing the current operation of the DNS 30) is published directly to the DNS 30 using the transmission path 11a. The registry data 23 (pertinent to the resource records 26) can be obtained synchronously or asynchronously (as a DNS request 23a) from a registry data source (e.g. a registry data client—i.e. a client of the server implementing the DNS publication service 22). The registry data client (of the DNS publication service 22) can be provided as the registrar 16, the registry operator 20, and/or the registry database 18 itself (e.g. via a registry server 18a managing transfer of registry data 23 into/out of the registry database 18 itself). It is important to note that the registry data client (e.g. network entity 16, 18, 20) only provides the registry data 23 to the DNS publication service 22. Importantly, the registry data client (from which the registry data 23 was obtained) does not receive the resultant DNS data 34 intended for receipt by the DNS 30 (as generated by the DNS publication service 22). Rather, preferably, the generated DNS data 34 (intended for current use by the DNs 30) is published to the DNS 30 in the network transmission path 11a that bypasses the registry data client. In other words, the generated DNS data 34 (as a response to the receipt of the registry data 23 in the form of a synchronous or asynchronous DNS request 23a from the registry data client) is not returned to the registry data client.

It is recognized that an appropriate response to the received DNS request 23a (e.g. a response from the DNS publication service 22 to the registry data client) can be, for example; an acknowledgement of receipt the DNS request 23a, a confirmation of generation/publication of the DNS data 34, a null response, or any other form of response other than transmission of the generated DNS data 34 for purposes of storing in the registry database 18. In other words, the registry data client does not expect to receive the generated DNS data intended for publication in the DNS 30, in response to the provision of the registry data 23 in the form of the DNS request 23a. It is recognized that the DNS request 23a can be a result of one or more changes (e.g. create/modify/delete) in the registry data 23 that is pertinent to the data contained in the resource records 26 of the DNS 30 (as implemented by the DNS servers 32). These changes in the registry data 23 can be the result of EPP transaction(s) received (and processed) by the registry operator 20 from a respective registrant 12 and/or registrar 16 for one or more domain name(s) 14 associated with the registry data 23. Another cause for receipt of the DNS request 23a by the DNS publication service 22 could be TTL requirements of the DNS data 34 (e.g. due to upcoming expiration of the current DNS data 34 held in the DNS 30). In any event, the generated DNS data 34 for current use in the DNS 30 is not stored in the registry database 18.

Domain Names 14

In general, the domain names 14 can be setup or otherwise maintained/renewed for a domain name registrant 12 (e.g. domain owner) via a domain name registrar 16 for one or more domain names 14 available (e.g. not yet claimed) or otherwise owned in a domain name registry 18 (e.g. a database of all domain names registered in a top-level domain (TLD)). The domain name registry 18 can be managed by a registry operator 20 (or the registry services provider 22) that also generates zones (e.g. represented by the relevant zone data) which represent a lookup of the domain names 14 to IP addresses, for example as performed by the DNS servers 32 using the DNS data 34 published by the publication system 10. As further described below, the DNS data 34 are based on resource records 26 (e.g. Name Server name/address records, Delegation Signer records, etc.) associated with the registry data 23 of particular domain name(s) 14. It is also recognized that the DNS data 34 can include other data specific to the DNS zone itself (e.g. the zone apex).

A zone data, e.g. the DNS data 34, is representative of a text file that describes a portion of the DNS called a DNS zone, including the owner of the record. A zone data (e.g. the DNS data 34) is organized in the form of resource records (RR) 26 and contains information that defines mappings between domain names 14 and IP addresses and other resources 31, as based upon registry data 23. For example, the DNS data 34 contains the DNS records 26 in wire transfer format, as implemented in the DNS 30. The format of zone data can be defined by a standard, with each line typically defining a single resource record 26. A line begins with a domain name, but if left blank, can default to the previously defined domain name. Following the domain name can be the time to live (TTL), the class (which is almost always "IN" for "internet" and rarely included), the type 26c of resource record (A, MX, SOA, etc.), followed by type-specific data such as the IPv4 address for A records. Comments can be included by using a semi-colon and lines can be continued by using parentheses. There are also directives that are marked with a keyword starting with a dollar sign.

Within the DNS publication system 10, the registry operator 20 can interact with the registry service provider 22 (aka DNS publication service 22), in order to facilitate registrants 12 responsible for generating and maintaining web pages 31 (e.g. network resources 31 that can be hosted by the registrants 12) associated with domain name 14. It is recognized that registrant 12 itself can communicate directly with registry service provider 22 for providing the registry data 23 used in generation of the DNS data 34, and/or can have the registry data 23 communicated to the registry service provider 22 (e.g. DNS publication service 22) via the registry operator 20 and/or the registrar 16. As such, once the DNS data 34 is published on the DNS 30, network 11 users can access network resources 31 via the network 11 and accordingly access content/services provided by the network resources 31 (e.g. web pages, web services, email services, etc.). An example of such access is the network 11 users 13 using a web browser to navigate on the network 11 to web pages 31 and displaying of web content 31 on a user interface of the user's 13 computer device 100 (see FIG. 5). It is recognized that the network 11 address (i.e. IP address) of the various network resources 31 are obtained by the users 13 via the DNS data 34 implemented by the DNS servers 32, as further described below.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that domain name registrar 16, registry operator 20 and DNS publication service 22 can be implemented on the computer devices 100 (see FIG. 5) such as servers and can communicate with one another via the network 11 in client-server relationships.

In general, a domain name 14 is an identification string that defines a realm of administrative autonomy, authority, or control on the Internet 11, whereby domain names 14 are formed by the rules and procedures of the DNS 30. Domain names 14 are used in various networking contexts and application-specific naming and addressing purposes, as an Internet Protocol (IP) resource 31, such as a personal computer used to access the Internet 11, a server computer 33 hosting a web site 31, or the web site 31 itself or any other service 31 communicated via the Internet 11. Domain names 14 are organized in subordinate levels (subdomains) of the DNS root domain, which is referred to as the root zone, and is represented as a single dot ("."). The first-level set of domain names 14 are the TLDs. Below these TLDs in the DNS 30 hierarchy are the second-level and third-level domain names 14 that are typically open for reservation by end-users who wish to connect local area networks to the Internet 11, create other publicly accessible Internet resources 31 or run web sites 31. There can be fourth- and fifth-level domains, and so on, with virtually no limitation. The registration of these domain names 14 is usually administered by domain name registrars 16 who sell their services to the public (i.e. registrants 12). Individual Internet host computers can use domain names 14 as host identifiers, or hostnames. Hostnames can be defined as the leaf labels in the domain name system usually without further subordinate domain name space and can appear as a component in Uniform Resource Locators (URLs) for Internet resources 31 such as web sites 31 having one or more web pages 31. Domain names 14 can also be used as simple identification labels to indicate ownership or control of a resource 31, such as realm identifiers used in the Session Initiation Protocol (SIP), DomainKeys used to verify DNS domains in e-mail systems 31, and in many other Uniform Resource Identifiers (URIs). For example, the domain name 14 can be a component of a (URL) used to access web sites 31, for example: URL—http://www.example.info/index.html, Top-level domain name: info, Second-level domain name: example.info, Host name: www.example.info.

Domain name 14 can consist of one or more parts, technically called labels, which are conventionally concatenated, and delimited by dots, such as example.info. Not that the rightmost dot, representing the root zone, is many times omitted in the vernacular—it should be implied if not specified (e.g. for the domain name expressed as "example.info", the Fully Qualified Domain Name would be "example.info."). The right-most label conveys the TLD, for example, the domain name www.example.info falls under the TLD info. The hierarchy of domains descends from the right to the left label (or from left to right depending upon language considerations) in the name; each label to the left specifies a subdivision, or subdomain of the domain to the right. For example: the label example specifies a node example.info as a subdomain of the info domain, and www is a label to create www.example.info, a (e.g. subdomain or otherwise an element of the current domain) of example.info. A hostname is a domain name 14 that has at least one associated IP address. For example, the domain names www.example.info and example.info may also be hostnames, whereas the info domain is not. However, other TLDs may indeed have an IP address, and if so, they are also hostnames. It is recognized that hostnames can impose restrictions on the characters allowed in the corresponding domain name 14. A valid hostname is also a valid domain name 14, but a valid domain name 14 may not necessarily be valid as a hostname.

Referring again to FIG. 1, the domain name registry 18 can contain those domain names 14 that are registered for a specific TLD, which is one of the domains immediately under the highest level in the hierarchical Domain Name System (DNS) 30 of the Internet 11. Practically speaking, TLD names 14 are installed in the root zone of the name space for the TLD and for all domains in lower levels, the TLD is the last part of the domain name 14, that is, the last label of a fully qualified domain name, with the trailing dot for the root zone designation. It is recognized that there can be a number of different TLD types, such as but not limited to: country-code top-level domains (ccTLD) consisting of two letter domains established for countries or territories; internationalized country code top-level domains (IDN ccTLD) which are ccTLDs in non-latin character sets (e.g., Arabic or Chinese) which are displayed in end-user applications in their language-native script or alphabet but use a Punycode-translated ASCII domain name in the Domain Name System 30; generic top-level domains (gTLD) which are top-level domains with three or more characters (e.g. GOV, EDU, COM, MIL, ORG, NET and INFO) including unsponsored top-level domains which are domains that operate directly under policies established for the global Internet community and sponsored top-level domains (sTLD) that are proposed and sponsored by private agencies or organizations that establish and enforce rules restricting the eligibility to use the TLD; and infrastructure top-level domain that is one domain, the Address and Routing Parameter Area (ARPA) managed on behalf of the Internet Engineering Task Force for various purposes specified in the Request for Comments publications.

Domain names 14 can be formed from the set of alphanumeric ASCII characters (a-z, A-Z, 0-9), but characters are case-insensitive. In addition, the hyphen can be permitted if it is surrounded by characters or digits, i.e. it is not the start or end of a label. Labels are separated by the full stop (period) character in the textual name representation, and are limited to 63 characters in length. It is recognized that the domain names 14 can be represented using characters based in other languages as well, including alternate formats as appropriate, as desired.

Figure 3:
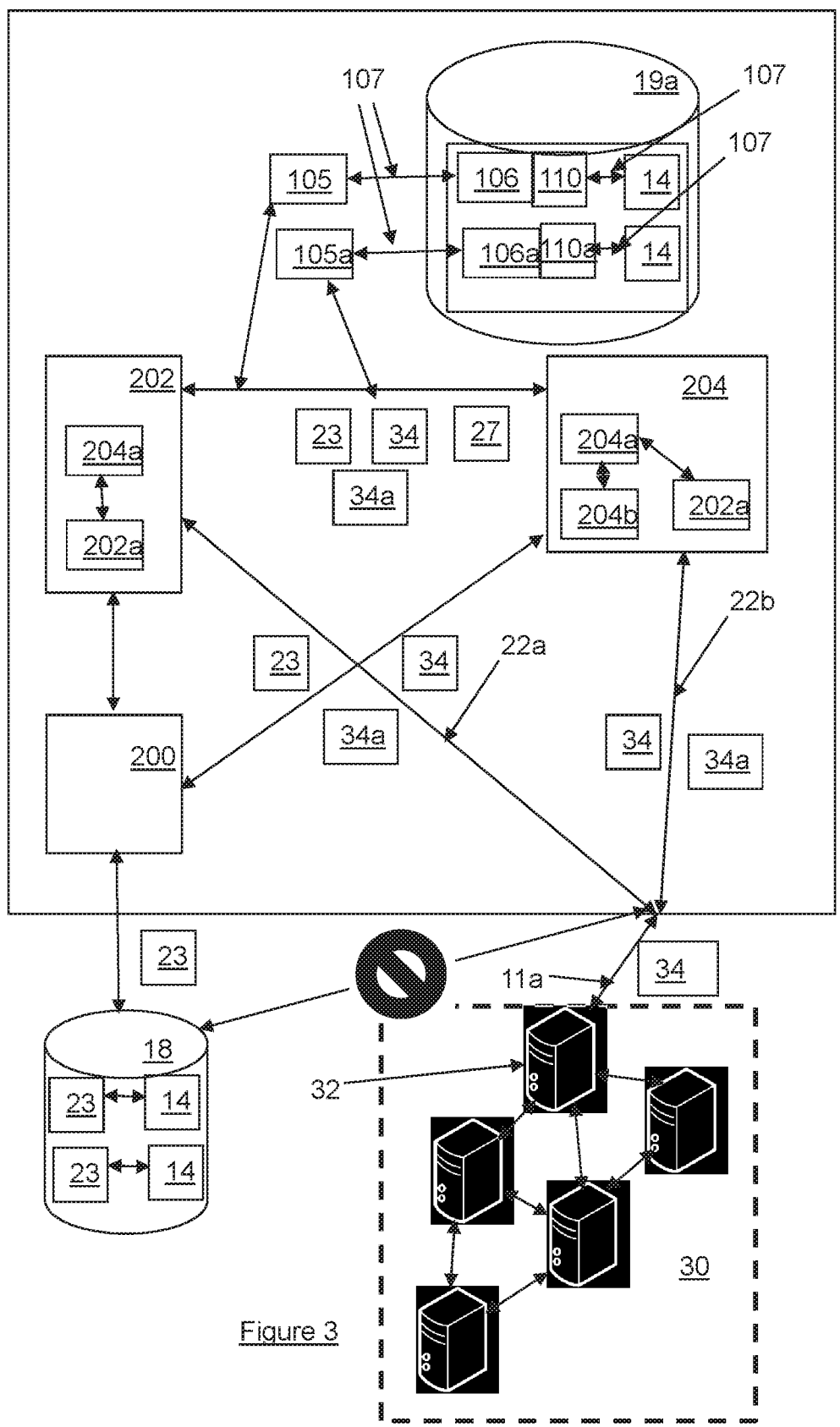
FIG. 3 is an example configuration of a DNS publication service for generating the DNS data of FIG. 2.

Referring to FIGS. 1 and 3, shown are network resources 31, which are accessible via a specified URI (over the network 11) of the server 33 incorporating the domain name 14 associated with the specified TLD maintained in domain name registry 18, using an appropriate network communications protocol (e.g. SMTP, HTTP, HTTPS, etc.). For example, the network communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the Internet) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

DNS Publication System 22

Figure 2:
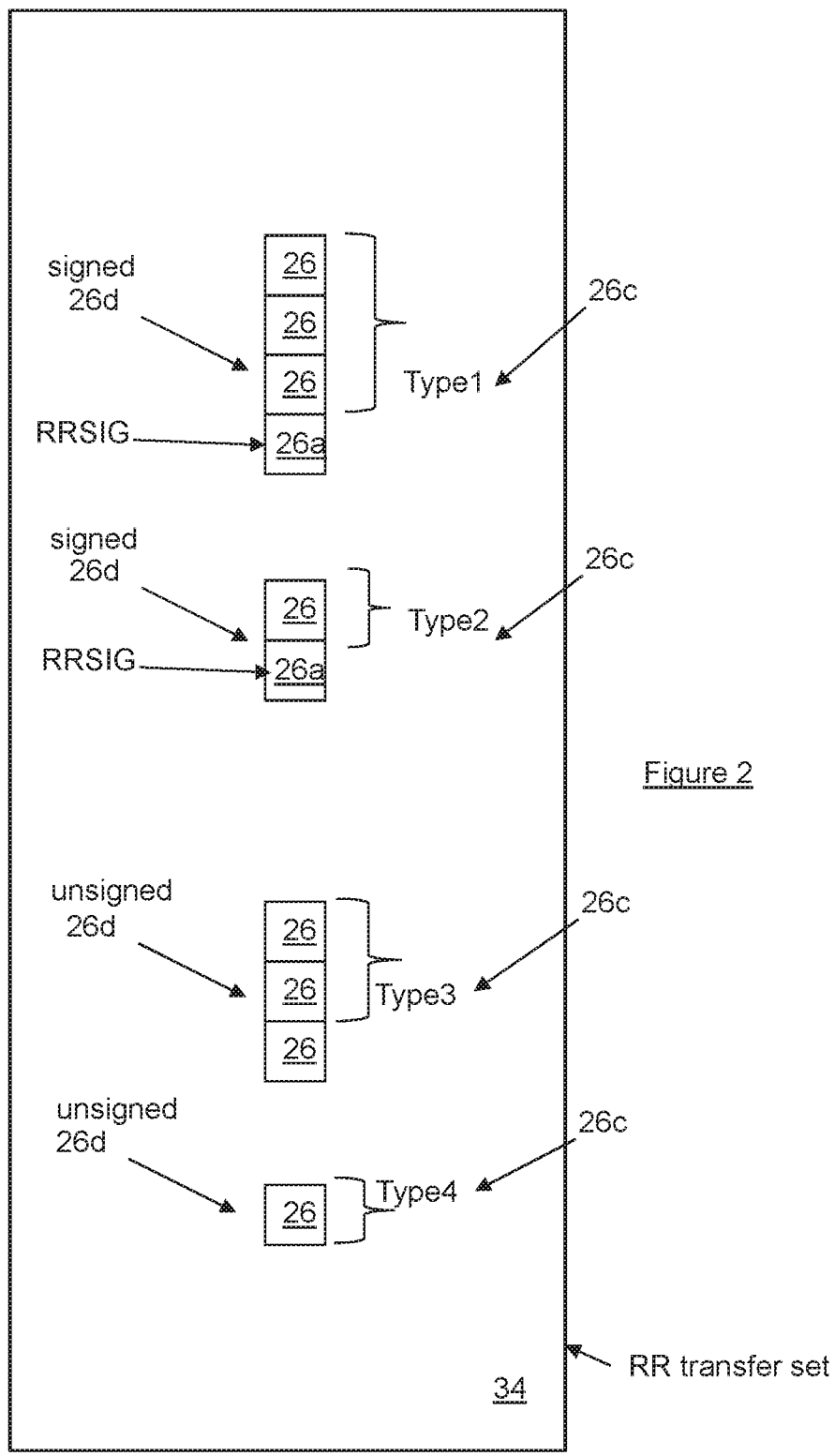
FIG. 2 is a block diagram of an example form of DNS data for the system of FIG. 1.

Referring to FIGS. 1-3, shown is a block diagram of the DNS publication system 22. The DNS publication system 22 has a plurality of components 200, 202, 204, e.g. configured as logical/software and/or hardware components for acting alone or in combination, for obtaining/receiving the registry data 23 from the registry database 18, for generating the DNS data 34 according to a set of generation instructions 105, and for transmitting the generated DNS data 34 to the DNS servers 32 of the DNS 30. Examples of the components could be a record selection module 200, a distribution system 202 and a signing system 204, further described below. It is recognized that the generation instructions 105 can include instructions (hosted/shared by one or more of the components 200, 202, 204) pertaining to the manner in which DNSSEC (and also include related DNSSEC records 106 stored in a DNSSEC storage 19a) is implemented or not with respect 107 to particular one or more domain name(s) 14 (e.g. domains, subdomains, etc. as part of a defined zone) having the resource records 26 (see FIG. 3). In one embodiment, the generation instructions 105, the DNSSEC records 106 and signing identifiers 110 can be stored in the table 38 see FIG. 1), such that each of the domain names 14 are assigned respective generation instructions 105, DNSSEC records 106 and/or signing identifiers 110 in the table 38. As such, the DNS publication service 22 consults (or is otherwise configured by) the generation instructions 105, DNSSEC records 106 and/or signing identifiers 110 when the DNS data 34 is generated for the respective domain name(s) 14.

For example, the components 200, 202, 204 could each be implemented as a set of instructions stored in a storage and executing on a computer processor (e.g. a server) in order to perform their respective functions (e.g. processing) on the registry data 23 and/or the DNS records 26. Alternatively, the components 200, 202, 204 could each be implemented as a hardware (e.g. a solid state device) having storage and one or more computer processors in order to perform their respective functions (e.g. processing) on the registry data 23 and/or the DNS records 26. Alternatively, the components 200, 202, 204 could each be implemented as a combination of a set of instructions stored in a storage and executing on a computer processor and a hardware (e.g. a solid state device) having storage and one or more computer processors in order to perform their respective functions (e.g. processing) on the registry data 23 and/or the DNS records 26.

It is recognized that the DNSSEC records 106 can be provisioned 107 for the respective domain name(s) 14 as part of the setup of the domain name(s) 14, in order to specify whether the domain name(s) 14 are to be "signed" or "unsigned" (e.g. for specified record type(s) 26c) as it pertains to the DNS data 34 generated by the DNS publication service 22. The provisioning 107 can include definition of respective signing key records for the zone apex of the domain name 14 (e.g. the domain as compared to the subdomains). The provisioning 107 can be considered as generating metadata (e.g. configuration parameters for a set of signing keys as well as designating which of the record types 26c are to be signed or unsigned) for the zone with respect to how the DNS data 34 should be generated for the domains and subdomains of the domain name 14.

For example, the generation instructions can include one or more signing identifiers 110 (e.g. the presence or absence of RRSIG record(s) 26a incorporated as part of the DNSSEC records 106 to be included in the DNS data 34, upon generation thereof). For example, one embodiment of the signing identifier(s) 110 in the generation instructions 105 could be instructions for the RR set 26d (for a particular record type 26c) to include the RRSIG record 26a, recognizing that the RRSIG record 26a signifies the particular record type 26c is signed during generation of the DNS data 34a for that particular record type 26c by the signing system 204. It is recognized that for an unsigned zone, i.e. the entire zone, all of the resource records 26 (e.g. all of the record types 26c) would be designated as unsigned (e.g. definition of key sets would be absent or otherwise null in the generation instructions 105). As an example of record types 26c for signing or not, for a signed zone (i.e. the provisioning 107 includes definition of a resource record key set): an A record type 26c is designated in the generation instructions 105 as signed for use by respective authoritative servers 32 of the DNS 30; the Delegation Signer (DS) record type 26c is designated in the generation instructions 105 as always signed; and Name Server (NS) record type 26c is designated in the generation instructions 105 as unsigned.

Another embodiment of the signing identifier 110 is an indication of record (type 26c) signed or record (type 26c) unsigned for each pertinent domain/subdomain for a particular zone (for the associated domain name 14). As such, one or more of the components 200, 202, 204 would have access to the signing identifier(s) 110, in order to guide the generation of the DNS data 34 for selected resource records 26 (as obtained from the registry database 18). For a considered signed domain name 14, it is recognized that the individual RR sets 26d (of the RR transfer set 34—see FIG. 2) can contain only signed records, as dictated by the generation instructions 106 and associated DNSSEC records 106 (or not) and the signing identifier(s) 110. For a considered signed domain name 14, it is recognized that the individual RR sets 26d (of the RR transfer set 34—see FIG. 2) can contain both signed records and unsigned records, as dictated by the generation instructions 105 and associated DNSSEC records 106 (or not) and the signing identifier(s) 110. For a considered unsigned domain name 14, it is recognized that the individual RR sets 26*d* (of the RR transfer set 34—see FIG. 2) can contain only unsigned records, as dictated by the generation instructions 105 and associated DNSSEC records 106 (or not) and the signing identifier(s) 110.

As such, in order to change particular domain name(s) 14 from signed to unsigned or from unsigned to signed, the provisioning 107 (defining of the generation instructions 105 and related DNSSEC records 106 and signing identifier (s)110) would be amended (e.g. by an administrator of the DNS publication service 22 upon request of the registrant 12 and/or registrar 16) to reflect such the change (e.g. between signed and unsigned), in order for the DNS publication service 22 to subsequently generate (post change in the provisioning 107) the appropriate DNS data 34 that is published to the DNS 30. For example, part of the provisioning 107 step for the particular domain name(s) 14 would be the administrator defining/configuring the generation instructions 105 (and applicable DNSSEC records 106 and identifier(s) 110) for each of the relevant record types 26*c* of the relevant domain name(s) 14 prior to subsequent generation of the DNS data 34 by the DNS publication service 22.

In terms of changing from an unsigned domain to a signed domain, the administrator could: (1) instruct the DNS publication system 22 (e.g. distribution system 22) to stop publication of the DNS data 34 to the DNS 30; (2) then reprovision 107 the domain by modifying the generation instructions 105 and any other DNS related instructions/records (106)/identifiers (110) to include generated keys with respect to the apex of the domain; and (3) would then instruct the DNS publication system 22 to resume publication of the DNS data 34. Accordingly, then the distribution system 202 would involve the signing system 204 for subsequently generated DNS data 34, for example as per any of the below-described embodiments A,B,C,D for implementing signed zone configurations of any of the components 200,202,204. Further, there may also be steps taken outside of this system to complete the process of making a domain name signed. Specifically, the parent zone would be modified to add a DS record 26 which matches a DNSKEY in the apex.

In terms of changing from a signed domain to an unsigned domain, the administrator could: (1) instruct the DNS publication system 22 (e.g. distribution system 22) to stop publication of the DNS data 34 to the DNS 30; (2) then reprovision 107 the domain by modifying the generation instructions 105 and any other DNS related instructions/records (106)/identifiers (110) to delete or otherwise exclude generated keys with respect to the apex of the domain (including removing all existing signatures from the zone); and (3) would then instruct the DNS publication system 22 to resume publication of the DNS data 34. Accordingly, then the distribution system 202 would inhibit use of the signing system 204 for subsequently generated DNS data 34, for example as per the applicable below-described embodiments A,B,C,D for implementing unsigned zone configurations of any of the components 200,202,204. Further to the above, it is recognised that relating to the parent zone, the DS record(s) 26 may need to be removed from the parent first, before implementing steps 1-3 above.

Other DNSSEC records 106 stored in the DNSSEC storage 19*a* can include records such as but not limited to: DNS Public Key (DNSKEY); and Delegation Signer (DS). In any event, it is recognized that the DNSSEC records 106 are not stored in the registry storage 18 along with the other registry data 23 pertaining to the domain name(s) 14, rather the DNSSEC records 106 are stored in the DNSSEC storage 19*a* as made available to the DNS publication service 22. It is further recognized that the generated DNS data 34, including (or not) any DNSSEC related data (e.g. values of the RRSIG record 26*a*, etc.), is also not stored in the registry database 18 subsequent to generation of the DNS data 34. Rather, the DNS data 34, once generated by the DNS publication system 22, is transmitted directly to the DNS servers 32 of the DNS 30 in a network path 11*a* (see FIG. 1) that bypasses the registry database 18.

Referring again to FIG. 3, there are considered a number of different operational embodiments of the DNS publication service 22. It is recognized that each of the operational embodiments for each respective component 200,202,204 could also be compatible with the other operational embodiments for each of the other respective components 200,202, 204.

Concerning the obtaining/receipt of the registry data 23 via the record selection module 200. In one embodiment A for the component 200, the registry data 23 (pertaining to the record types 26*c* of the DNS data 34) could be pushed to the record selection module 200 by the registry operator 20 (as collected from the registry database 18), upon the registry operator 20 processing a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or for existing domain name(s) 14. In a further embodiment B for the component 200, the registry data 23 (pertaining to the record types 26*c* of the DNS data 34) could be pulled by the record selection module 200 from the registry operator 20 (as collected from the registry database 18), upon monitoring and detecting by the record selection module 200 that the registry operator 20 processed a registry transaction 110 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or existing domain name(s) 14. It is recognized that any/all of the functionality of the record selection module 200 and the distribution system 202 can be combined in one system/module as desired, or can be separated as described by example only.

Concerning generation of DNS data 34 as unsigned by the distribution system 202 (i.e. component 202), utilizing the registry data 23 as provided by the record selection module 200 (i.e. those registry data 23 obtained/received from the registry database 18).

In one embodiment A for the component 202, the distribution system 202 would (1) receive the registry data 23, (2) would consult the generation instructions 105 (and associated signing identifier(s) 110) in order to identify that the corresponding resource records 26 are to remain unsigned (e.g. the signing identifier(s) 110 indicate that the record type(s) 26*c* are to be unsigned), (3) would generate the DNS data 34 using the generation instructions 105 and the registry data 23, and (4) would send the DNS data 34 in transmission paths 11*a*,22*a* to the DNS 30 that bypass the signing system 204 as well as the registry database 18. One advantage to this embodiment A for component 202 is that the signing system 204 computing resources (e.g. receiving/processing resource records 26 that ultimately are not signed) are not utilized needlessly for those resource record(s) 26 that are identified by the signing identifier(s) 110 as unsigned.

In a further embodiment B for the component 202, the distribution system 202 would (1) receive the registry data 23, (2) would optionally consult the generation instructions 105 (and/or associated signing identifier(s) 110) in order to identify that the resource records 26 pertaining to the registry data 23 are to remain unsigned (e.g. the signing identifier(s) 110 indicate that the record type(s) 26c are to be unsigned), (3) would send the DNS data 34 in a transmission path 11a to the DNS 30 that bypasses the registry database 18. In this embodiment B for the component 202, the signing system is used to generate the DNS data 34. One advantage to this embodiment B for component 202 is that signing system 204 computing resources (e.g. for publishing the DNS data 34) are not utilized needlessly.

In a further embodiment C for the component 202, the distribution system 202 would (1) receive the registry data 23, (2) would optionally consult the generation instructions 105 (and/or associated signing identifier(s) 110) in order to identify that the resource records 26 pertaining to the registry data 23 are to remain unsigned (e.g. the signing identifier(s) 110 indicate that the record type(s) 26c are to be unsigned), (3) would send the registry data 23 to the signing system 204 in order for the signing system 204 to generate the DNS data 34 using the generation instructions 105, and (4) the signing system 204 would send the DNS data 34 in transmission paths 22b,11a to the DNS 30 that bypass the registry database 18 and the distribution system 202. In this embodiment C for the component 202, the signing system is used to generate the DNS data 34 as well as to publish the generated DNS data 34. One advantage to this embodiment C for component 202 is that the distribution system 202 computing resources (e.g. for publishing the DNS data 34) are not utilized needlessly.

Concerning generation of DNS data 34 as containing both unsigned and signed (by the signing system 204), utilizing the registry data 23 as provided by the record selection module 200 and/or the distribution system 202 (i.e. those registry data 23 obtained/received from the registry database 18).

In one embodiment A for the component 204, the signing system 204 would (1) receive the registry data 23 from the component 200,202, (2) would consult the generation instructions 105 (and associated signing identifier(s) 110) in order to identify which of the corresponding resource records 26 are to be signed (e.g. the signing identifier(s) 110 indicate that the record type(s) 26c are to be signed—as well as if relevant where any of the record type(s) 26c are to remain unsigned), (3) would generate the DNS data 34 using the generation instructions 105, and (4) would send the DNS data 34 in transmission paths 11a,22b to the DNS 30 that bypass the distribution system 202 as well as the registry database 18. One advantage to this embodiment A for component 204 is that the distribution system 202 computing resources (e.g. publishing resource records 26) are not utilized needlessly.

In a further embodiment B for the component 204, the signing system 204 would (1) receive the registry data 23, (2) would consult the generation instructions 105 (and/or associated signing identifier(s) 110) in order to identify which of the resource records 26 are to remain unsigned and those to be signed (e.g. the signing identifier(s) 110 indicate that the record type(s) 26c are to be unsigned/signed), (3) would generate the DNS data 34 using the generation instructions 105, and (4) would send the DNS data 34 to the distribution system 202, which would send the DNS data 34 in the transmission paths 22a,11a to the DNS 30 that bypass the registry database 18. In this embodiment B for the component 204, the signing system 204 is used to generate the DNS data 34, while the distribution system 202 is used to publish the generated DNS data 34 to the DNS 30.

In a further embodiment C for the component 204, (1) the record selection module 200 would receive the registry data 23, (2) the record selection module 200 would consult the generation instructions 105 (and/or associated signing identifier(s) 110) in order to identify which of the resource records 26 are to remain unsigned and those that are to be signed (e.g. the signing identifier(s) 110 indicate that the record type(s) 26c are to be unsigned/signed), (3) the record selection module 200 would send the registry data 23 and identify those resource records 26 (e.g. a first record portion) as unsigned to the distribution system 202 in order for the distribution system 202 to generate the unsigned portion of the DNS data 34 using the generation instructions 105 and the registry data 23, (4) the record selection module 200 would identify those resource records 26 as signed (e.g. a second record portion) to the signing system 204 in order for the signing system 204 to generate the signed portion of the DNS data 34 using the generation instructions 105 and the registry data 23, and (5) one or more of the components 200,202,204 would send both the signed and unsigned portions of the DNS data 34 in the transmission path 11a to the DNS 30 that bypasses the registry database 18. In this embodiment C for the component 204, one advantage is that the signing system 204 computing resources (e.g. for signing the DNS data 34) are not utilized needlessly for resource records 26 that are to remain unsigned.

In a further embodiment D for the component 204, (1) the record selection module 200 would receive the registry data 23, (2) the record selection module 200 would consult the generation instructions 105 (and/or associated signing identifier(s) 110) in order to identify which of the resource records 26 are to remain unsigned and those that are to be signed (e.g. the signing identifier(s) 110 indicate that the record type(s) 26c are to be unsigned/signed), (3) the record selection module 200 would send the registry data 23 and identify those resource records 26 (e.g. a first record portion) as unsigned to the signing system 204 in order for the distribution system 202 to generate the unsigned portion of the DNS data 34 using the generation instructions 105 and the registry data 23, (4) the record selection module 200 would also identify those resource records 26 as signed (e.g. a second record portion) to the signing system 204 in order for the signing system 204 to generate the signed portion of the DNS data 34 using the generation instructions 105 and the registry data 23, and (5) one or more of the components 200,202,204 would send both the signed and unsigned portions of the DNS data 34 in the transmission path 11a to the DNS 30 that bypasses the registry database 18. In this embodiment D for the component 204, one advantage is that the signing system 204 computing resources (e.g. for signing the DNS data 34) are not utilized needlessly for resource records 26 that are to remain unsigned.

It is recognized that for this embodiment D for the component 204, the signing system 204 does receive all of the registry data 23 for use in generation of the DNS data 34, however identification of which resource records 26 are to be unsigned (the first record portion) and which resource records 26 are to be signed (the second record portion) has already been processed by the record selection module 200 in advance of sending the registry data 23 to the signing system 204. As such, in this embodiment D for the component 204, a further advantage is that the signing system 204 computing resources (e.g. for identifying which of the resource records 26 are for signing or not) are not utilized needlessly for resource records 26 that are to remain unsigned. Identification of the first portion of the resource records 26 and the second portion of the resource records 26 can be embodied as a checklist 27 (indicating whether a particular resource record 26 of the set of resource records 26 sent to the signing system 204 is to be signed or unsigned), such that the resource records 26 identified as unsigned are listed/generated in the checklist 27 prior to sending the registry data 23 to the signing system 204. Accordingly, both the registry data 23 and the checklist 27 are received by the signing system 204, such that the signing system 204 can consult the checklist 27 and send the second portion of the resource records 26 to a signing module 204b (of the signing system 204) and the first portion of the resource records 26 in a path that bypasses the signing module 204b.

For example, referring to FIG. 3, the signing module 204b performs the function of generating the actual signatures (for population of respective signature records of the DNS data 34) using the private keys defined in the generation instructions 105 of the domain. The signing module 204b could be a hardware security module (HSM), as a physical computing device used to safeguard and manage digital keys for strong authentication and provision of cryptoprocessing. The HSM modules 204b can be embodied in the form of a plug-in card or an external device (containing one or more secure cryptoprocessor chips) that attaches directly to a computer or network server of the signing system 204. For example, the HSM module(s) 204b can be used to store the key material used to sign the zone files/records (e.g. the DNS data 34). A recognized open source tool for managing signing of DNS zone files using HSM 204b is OpenDNSSEC. In terms of a DNS record module 204a, this module can be responsible for building the RR sets 26d of the DNS data 34, in particular requesting signatures from the signing module 204b and incorporating the received signatures using DNS syntax (e.g. stored in the generating instructions 105) to build/generate the DNS data 34. As such, the signing system 204 can be implemented as a multifunctional module for both the signature generation and RR set 26d generation functions. Alternatively, the signing system 204 can be subdivided into dedicated one or more signing modules 204b and dedicated one or more DNS record modules 204a. It is also recognized that in the case of the unsigned zone, the distribution system 202 can include a DNS record module 204a for generating the unsigned DNS data 34, or can rely upon a respective DNS record module 204a of the signing system 204 in order to generate the unsigned DNS data 34 for the unsigned zone. Further, it is recognized that the distribution system 202 and/or the signing system 204, depending upon the embodiment A,B,C,D of the components 200,202,204 implemented, can have a publication module 202a for use in receiving the DNS data 34 once generated and then sending/transmitting to the DNS 30 using the transmission path 11a. For example, the publication module 202a would be aware of the network 11 addresses for one or more of the DNS servers 32 associated with the DNS 30, in order to coordinate reception of the DNS data 34 (e.g. as generated by the DNS record module 204a) and then subsequent transmission over the network path 11a to one or more of the DNS servers 32 of the DNS 30.

The signing module 204b can be embodied as a DNSSEC key management and a signing appliance like Secure64® DNS Signer, BlueCat Networks, Xelerance DNSX Secure, Signer, and Infoblox. Such appliances may provide various aspects of key management and zone signing, but require hardware to be installed.

DNS 30 and DNSSEC

Referring to FIGS. 1 and 2 and 3, the DNSSEC process is utilized by the DNS servers 32 of the DNS 30 to utilize digitally signed DNS data 34 (e.g. digitally signed DNS records also referred to as one or more Resource Record sets (RR set) 26d) at the authoritative DNS server (of the DNS servers 32) with encryption technology (e.g. public-key cryptography). It is also recognized that some of the resource records 26 (as part of the RR set(s) 26d) can also be unsigned (i.e. do not include a respective RRSIG record 26b associated as part of the RR set 26a of a particular record type 26c). Some of the registry data 23 for the resource records 26, used as part of the DNS data 34, are obtained from the registry database 18 associated with the particular domain name 14 (e.g. website URL), e.g. obtained by the DNS publication service 22 from the registry database 18 and/or provided to the DNS publication service 22 by the registry operator 20, for example. In particular, it is recognised that the registry data 23 of the registry database 18 only contain unsigned registry data 23. As such, any record(s) contained in the RR set 26d relating to DNSSEC (e.g. the RRSIG record 26a) is/are incorporated into the RR set 26d by a signing system 200 of the DNS publication system 10, see FIG. 4, and as such are not obtained by the DNS publication service 22 from the registry database 18 in performance of generating the DNS data 34 for subsequent publication to the DNS servers 32 of the DNS 30. Other DNSSEC related resource records 26 of the DNS data 34 can include records such as but not limited to: DNS Public Key (DNSKEY); Delegation Signer (DS); Next Secure (NSEC/NSEC3).

As further described, it is also recognized that the DNS data 34 is not stored in the registry data base 18, rather the DNS data 34 is generated (on demand/as needed when it needs to be signed as pertaining to TTL considerations or otherwise as relationship(s) of the data dictate) by the DNS publication service 22 as needed (e.g. due to recognized/identified DNS pertinent changes to the registry data 23 stored in the registry database 18). Once generated by the DNS publication service 22, the DNS data 34 is submitted directly to the DNS servers 32 of the DNS 30 using transmission path 11a.

In general, the DNS data 34 (aka DNS records or zone files referred to as a Resource Record transfer/transaction 34) are instructions that are published (e.g. transmitted to the DNS servers 32) by the DNS publication service 22 to the (authoritative) DNS servers 32. The DNS data 34 provides information about a domain name 14 can include what IP address is associated with that domain name 14 and how to handle requests (e.g. DNS requests from the users 13) associated with network resources 31 for that domain name 14. For example, a DNS record 26 can be defined as a single entry of the DNS data 34 that gives zone instructions on how to handle any given DNS 30 related request based on record type 26c. In general, most every DNS record 26 has at least three pieces of information, namely: a Record Name (i.e. label); Record Value/Data; and Time to Live (TTL).

These DNS records 34 consist of a series of stored records written in what is known as DNS syntax. DNS syntax can be a string of characters used as commands, which instruct the DNS server 32 what to do (e.g. provides the answer for a DNS query request from the network user 13) upon receiving a DNS lookup request from the network user 13, for example. All DNS records 34 can also have a 'TTL', which stands for time-to-live, and indicates how often a DNS server 32 would refresh that particular DNS record 34. Accordingly, all domains are required to have at least a few essential DNS records 34 for the user 13 to be able to access the website(s) associated with the domain name 14, amongst other optional additional DNS 30 implemented functionality.

Referring again to FIG. 2, for signed versions of the DNS data 34, i.e. those including the RRSIG 26a, when DNSSEC is used (i.e. the particular RR set 26d is digitally signed), each answer provided by the DNS server 32 (e.g. to a received DNS lookup of the user 13) would contain at least one RRSIG record 26a, in addition to other record types 26c that were requested. As such, the RRSIG record 26a represents a digital signature of the answer DNS resource record set, i.e. RR set 26d containing one or more resource records 26 of the same record type 26c. Further, the digital signature contained in the RRSIG record 26a can be verified by the server (e.g. checking as compared to resolving—resolver/validating server used by the user 13 in processing the DNS lookup/access to the network resource 31) communicating with the DNS server 32 by locating the correct public key found in the DNSKEY record of the DNS data 34. It is further recognized that each RR set 26d can contain one or more resource records 26 of the same record type 26c. Further, each RR set 26d can be signed (and thus contain at least one respective RSIG record 26a—e.g. when rolling a ZSK you can include dual signatures to sign), or can be unsigned (and thus not contain a respective RRSIG record 26a). It is also recognized that, as shown by example in FIG. 2, that each set of DNS data 34 (e.g. also referred to as a set of DNS records or RR transfer set or RR transaction set) can contain one or more RR set(s) 26d. Also, preferably, each set of DNS data 34 only contains one RR set 26d for a particular resource record type 26c (e.g. signed or unsigned).

In view of the above, it is recognized that utilization of the DNS data 34, via the DNS 30, can facilitate determination by a security-aware DNS resolver (the one or more network server(s) assisting the network user 13 in navigating to the network 11 (e.g. IP) address the user wishes to access—i.e. for interaction with the respective network resource(s) 31) if a) the answer (to a DNS lookup request) the resolver server received was correct (i.e. secure), b) whether the DNS server 32 for the domain being queried doesn't support DNSSEC (insecure), c) if there is some sort of error with the answer obtained from the DNS server 32, and/or d) that the authoritative server 32 that was queried is at least one of a plurality of servers that is/are authoritative to send the response. Further, it is recognized that, in general, the DNS data 34 published to the DNS 30 is useful in facilitating that the correct DNSKEY record can be found via an Authentication Chain, starting with a known good public key (facilitating a secure entry point) for a Trust Anchor, preferably at the DNS root. This public key can then be used by the respective servers (e.g. resolver server) to verify a delegation signer (DS) record associated with the respective domain name 14 of interest to the network user 13. For example, a DS record in a parent domain (DNS zone) can then be used to verify a DNSKEY record in a subdomain, which can then contain other DS records to verify further subdomains.

In view of the above, it is recognized that the registry data 23, some of which can be obtainable from the registry database 18 for the particular domain name 14, can be pertinent to the resource records 26 such as but not limited to: A Records 26—and/or AAA Records 26 which are the most basic type of DNS record and are used to point a domain or subdomain to an IP address (e.g. assigning a value to an A record is associated with an IP address to where the domain or subdomain should point and a TTL; CNAME records 26—which are used to point a domain or subdomain to another hostname, for example as a means of being able to change an IP address of a server or cluster of servers; Mail Exchanger (MX) records 26—which are used to help route email according the domain owners preference, such that the MX record itself specifies which server(s) to attempt to use to deliver mail to when this type of request is made to the domain; and TXT records—which are used to store any text-based information, for example used to hold SPF data and verify domain ownership. Other registry data 23 pertinent to resource records 26 can include: a NS record 26 (more common)-storing the name server for a DNS entry; DNSKEY record 26—the DNS Key Record' contains a public key used to verify signatures; CDNSKEY record 26—a child copy of the DNSKEY record, meant to be transferred to a parent; a standardized network protocol used on IP networks; DNAME record 26—the 'delegation name' record creates a domain alias, just like CNAME, but this alias will redirect all subdomains as well. In general, it is recognized that only unsigned registry data 23 is contained in the registry database 18.

Further, is also recognized that those resource records 26 of the DNS data 34 that are DNSSEC related, e.g. the RRSIG record 26a, the DS record 26, the DNSKEY records 26, etc. are also not stored in the registry database 18. As such, the resource records 26 of the DNS data 34 that are DNSSEC related can already be known to the DNS publication service 22 (e.g. to the signing system 204 and/or the distribution system 202 as per the provisioning 107 of the generation instructions 105), in advance of receiving (or otherwise obtaining) the relevant registry data 23 from the registry database 18 in order to perform the generation of the DNS data 34 (e.g. for the purposes of configuration of a new domain name 14 added to the domain/zone and/or an update to the DNS data 34 based on registry data 23 related transactions implemented by the registry operator 20 on the registry data 23 stored in the registry database 18). Also recognized is that the TTL parameter of the DNS data 34 can play a role in triggering an update to the DNS data 34, as performed by the DNS publication system 10.

Referring again to FIG. 2, DNSSEC was designed to deal with cache poisoning and a set of other DNS vulnerabilities such as man in the middle attacks and unauthorized data modification in authoritative servers. Its major objective is to provide origin authentication and integrity protection for the DNS data 34. The public key infrastructure (PKI) can be used as means of public key distribution for the signed RR set(s) 26d of the DNS data 34. DNSSEC provides a verification mechanism for the DNS data 34 and is not an encryption mechanism. It allows a security-aware resolver 35 (see FIG. 1) to verify that the zone data that has been received is signed by the administrator of the zone who holds the private key.

As discussed, a zone may have one or more key pairs, each of which includes private key and public key. The private keys may be stored securely in the DNS publication service 22 (e.g. in the HSM 204b—see FIGS. 3,4) and used to sign zone data (e.g. the DNS data 34). The public keys may be stored in the DNS publication service 22 and also stored in the signed DNS data 34 as DNSKEY resource records. The public keys are used to verify zone data. DNSKEY records typically have the following data elements: Flags—"Zone Key" and "Secure Entry Point"; Protocol—fixed value of 3 (for backwards compatibility); Algorithm—the public key's cryptographic algorithm; and Public key—public key data. A DNSKEY Resource Record ("RR") may be either a Zone Signing Key (ZSK) or a Key Signing Key (KSK). The Key Signing Keys (KSKs) will have a SEP flag set so that they can be distinguished from the ZSKs in the DNSKEY RRset. The Key Signing Keys (KSKs) are used to sign other DNSKEY resource records and are used to build a chain of authority to the data that is validated.

The RRSIG resource record 26a (see FIG. 2) holds the DNSSEC signature of a resource record set RRset 26d (one or more DNS records 26 with the same name, class, and type). DNSSEC enabled resolvers 35 (see FIG. 1) can verify the signature with a public key stored in the DNSKEY-record. The RRSIG records can have the following data elements: Type Covered—DNS record type that this signature covers; Algorithm—cryptographic algorithm used to create the signature; Labels—number of labels in the original RRSIG-record name (used to validate wildcards); Original TTL—TTL value of the covered record set; Signature Expiration—when the signature expires; Signature Inception—when the signature was created; Key Tag—a short numeric value which can help quickly identify the DNSKEY-record which can be used to validate this signature; Signer's Name—name of the DNSKEY-record which can be used to validate this signature; and Signature—cryptographic signature. Further, it is recognized that the DNSKEY RRs can be signed by both active KSKs (providing for higher level security over simply using one key—e.g. the DNSKEY-alone) and ZSKs. Accordingly, DNS 30 can be operated using one key (e.g. DNSKEY) or can have key sets (e.g. ZSK and KSK set).

The NSEC resource record 26 can list two separate things: the next owner name (in the canonical ordering of the zone) that contains authoritative data or a delegation point NS RRset 26d, and the set of RR types 26c present at the NSEC RR's owner name. The complete set of NSEC RRs 26 in a zone indicates which authoritative RR sets 26d exist in a zone and also form a chain of authoritative owner names in the zone. These resource records 26 can be used by resolvers 35 to verify the non-existence of a record name and type 26c as part of DNSSEC validation. NSEC-records can have the following data elements: Next domain name—the next record name in the zone (DNSSEC sorting order); and Record types—the DNS record types 26c that exist for the name of this NSEC-record.

The NSEC3 Resource Record (RR) 26 can provide authenticated denial of existence for DNS RR sets 26d. The NSEC3 RRs 26 have the same functionality as NSEC RR 26, except NSEC3 uses cryptographically hashed record names to thwart enumeration of the record names in a zone. An NSEC3-record can link to the next record name in the zone (in hashed name sorting order) and can list the record types 26c that exist for the name covered by the hash value in the first label of the NSEC3-record's own name. These resource records 26 of the DNS data 34 can be used by the resolvers 35 to verify the non-existence of a record name and type as part of DNSSEC validation. NSEC3-records 26 can have the following data elements: Hash Algorithm—the cryptographic hash algorithm used; Flags—"Opt-out" (indicates if delegations are signed or not); Iterations—how many times the hash algorithm is applied; Salt—salt value for the hash calculation; Next Hashed Owner Name—the name of the next record in the zone (in hashed name sorting order); and Record Types—the record types 26c that exist for the name covered by the hash value in the first label of the NSEC3-record's own name.

Method 300

Figure 4:
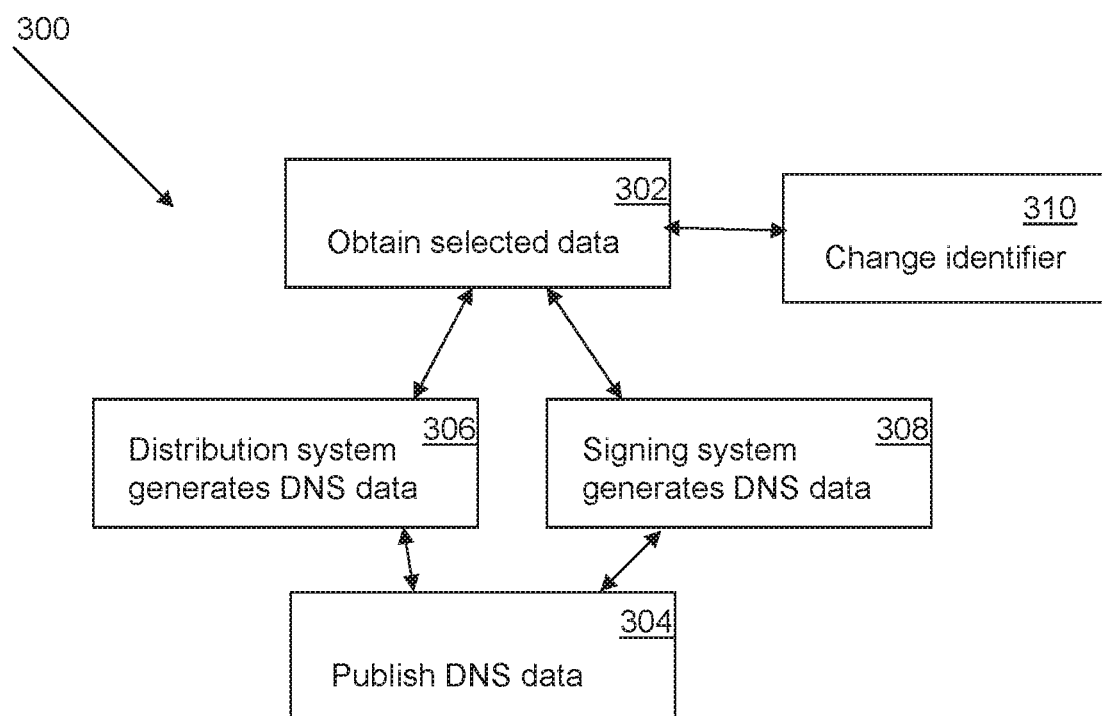
FIG. 4 is an example implementation of the DNS publication service of FIG. 3.

Referring to FIG. 4, shown is a method 300 for publishing the plurality of Domain Name System (DNS) records 34a for the domain name 14. The method comprises a step 302 of obtaining by a record selection module 200 selected data of registry data 23 associated with the domain name 14 in the registry database 18; a further step 304 of implementing a distribution system 202 for coordinating the publishing of the set of DNS records 34 in the DNS 30 by facilitating transmitting of the set of DNS records 34 to one or more authoritative servers 32 of the DNS 30 in a transmission path 11a that bypasses storing of the signed DNS record in the registry database 18, the set of DNS records 34 generated based on a signing identifier 110 (designating the selected data as to be signed or not signed) on how to generate the set of DNS records 34 by either:

a) sending 306 the selected data to the DNSSEC signing system 204 for subsequent direct inclusion as the signed DNS record in the set of DNS records 34 by the DNSSEC signing system 204 using the set of generation instructions 105; or b) including 308 the selected data as an unsigned DNS record in the set of DNS records 34 by the distribution system 202 using the set of generation instructions 105, wherein the transmission path 11a also bypasses the at least one signing module 204b of the DNSSEC signing system 204.

As discussed above, the DNSSEC signing system 204 has at least one signing module 204b for digitally signing the selected data of the registry data 23, the digitally signing using one or more signing keys (SK) to generate a signed DNS record, the one or more signing keys associated with the registry data 23 of the domain name 14. For example, the unsigned DNS record can be a Name Server (NS) record. For example, the signed DNS record can be a Delegation Signer (DS) record. For example, the set of DNS records 34 with the signed DNS record also includes a public key of the one or more signing keys as a DNSKEY record.

In terms of step 306, the distribution system 202 can consult the signing identifier 110 before sending of the selected data of the registry data 23 to the DNSSEC signing system 204. It is also recognised that the record selection module 200 can be incorporated as part of the distribution system 202. It is also recognised that the distribution system 202 can decide to bypass the signing system 204 for unsinged records 26.

As an option in step 306, the distribution system can generate a checklist 27 for separating the selected data into a first portion of the registry data 23 and a second portion of the registry data 23, the first portion of the registry data 23 for inclusion in the set of DNS records 34 as unsigned records and the second portion of the registry data 23 for inclusion in the set of DNS records 34 as signed records, the distribution system 202 sending the checklist 27 with the selected data to the DNSSEC signing system 204.

As an option in step 308, the DNSSEC signing system 204 can incorporate the first portion of the registry data 23 in the set of DNS records 34 in a path that bypasses the at least one signing module 204b and incorporates the second portion of the registry data 23 in the set of DNS records 34 using one or more digital signatures as obtained from the at least one signing module 204b.

As an option in step 308, the DNSSEC signing system 204 can generate a checklist 27 for separating the selected data into the first portion of the registry data 23 and the second portion of the registry data 23, the first portion of the registry data 23 for inclusion in the set of DNS records 34 as unsigned records and the second portion of the registry data 23 for inclusion in the set of DNS records 34 as signed records.

As an option in step 308, the DNSSEC signing system 204 can incorporate, e.g. using the checklist 27, the first portion of the registry data 23 in the set of DNS records 34 in a path that bypasses the at least one signing module 204b and incorporates the second portion of the registry data 23 in the set of DNS records 34 using one or more digital signatures as obtained from the at least one signing module 204b.

The system of claim 1, wherein the distribution system further includes a publication module for implementing said sending of the set of DNS records.

As noted above, the signing identifier 110 can be defined as a presence of a DNSSEC record flag (e.g. indicator) in the set of generating instructions 105 used to generate the set of DNS records 34. Using FIG. 2 as an example, the signing identifier 110 can be assigned to each resource record type 26c that is defined to include the RRSIG record 26a of the signed version of the RR set 26d for the respective selected data of the registry data 23 (e.g. the second portion of the registry data 23). Therefore, for example, instructions for generating the RRSIG record flag of the RR set 26d in the generating instructions 105 can be defined as the signing identifier 110. In other words, the record generation module 204a, when following the generating instructions 105, would include the RRSIG record flag (as one example of the signing identifier 110) for a particular resource record type 26c and thus instruct the at least one signing module 204b to generate a signature using the set of signing keys SK designated for the domain name 14. It is also recognized that the presence of other DNSSEC records (e.g. DS record, DNSKEY, etc.) associated with the generating instructions 105 can be used as indication (e.g. as a signing identifier 110) by the record generation module 204a that the DNS data 34 should contain signed DNS records.

In the general case where there is an absence of any DNSSEC record flags in the generating instructions 105, the record generation module 204a can use this absence of any DNSSEC record flags pertaining to the RR sets 26d (for the domain name 14) to indicate that the domain name 14 is an unsigned domain. Therefore, for example, the absence of the RRSIG record flag of the RR set 26d in the generating instructions 105 can be defined as the signing identifier 110 (i.e. indicating the unsigned designation). In other words, the record generation module 204a, when following the generating instructions 105, would note the absence of the RRSIG record flag (as one example of the signing identifier 110) for a particular resource record type 26c and thus not instruct the at least one signing module 204b to generate a signature using the set of signing keys SK designated for the domain name 14. It is also recognized that the absence of other DNSSEC records (e.g. DS record, DNSKEY, etc.) associated with the generating instructions 105 can be used as indication by the record generation module 204a that the DNS data 34 should contain one or more unsigned DNS records.

Further to the above, it is also recognized that the signing identifier 110 can be embodied as a defined identifier that is other than presence/absence of DNSSEC records in the generating instructions 105. For example, the signing identifier 110 can be a defined signing flag (something other than a defined DNSSEC record type incorporated in one or more of the RR set records 26d of the DNS data 34, associated with none, or one or more resource record types 26c in the generating instructions 105. Accordingly, the embodiment of the flag used as the signing identifier 110 is such that the flag value, and/or the flag field itself, is not explicitly included in the RR set records 26d of the DNS data 34. As such, the flag/flag field is defined outside of and record field(s) and/or record field values contained in the DNS data 34.

For example, the defined signing flag (as the signing identifier 110) can be a flag containing a "signed designation" or an "unsigned designation" for the entire domain pertaining to the domain name 14. For example, for an unsigned domain, the signing identifier can be a single flag for the entire set of registry data 23 (pertaining to the DNS records for the domain name 14) in order to indicate the domain name 14 as an unsigned domain (i.e. having the absence of any DNSSEC related records in the DNS data 34).

A further example, the defined signing flag (as the signing identifier 110) can be a flag containing a "signed designation" for the entire domain pertaining to the domain name 14. For example, for the signed domain, the signing identifier can be a single flag for the entire set of registry data 23 (pertaining to the DNS records for the domain name 14) in order to indicate the domain name 14 as a signed domain (i.e. having the presence of a plurality of DNSSEC related records in the DNS data 34 for all of the respective resource record types 26c).

A further example, the defined signing flag (as the signing identifier 110) can be a respective flag of a plurality of flags containing a "signed designation" for each of the resource record types 26c in the entire domain pertaining to the domain name 14. For example, for the signed domain, the signing identifier can be a respective flag assigned on per resource record type 26c basis for the entire set of registry data 23 (pertaining to the DNS records for the domain name 14), in order to indicate the domain name 14 as a signed domain (i.e. having the presence of a plurality of DNSSEC related records for at least one resource record type 26c in the DNS data 34).

If DNSKEYS are established in the signing system, the mere presence of the keys for a particular zone. It is recognized that one or more of the record types can be signed/unsigned in the zone pertaining to the keys associate with the zone in the instructions (e.g. as one embodiment of the signing identifier 110).

The method 300 can also include the optional step 310 of modifying the signing identifier 110 by changing from an unsigned designation to a signed designation. (e.g. based on a decision of the registrant 12 and/or registrar 16). Step 310 can include a receipt module (e.g. the record selection module 200) for receiving a request to change the signing identifier 110 and for facilitating the changing of the signing identifier 110 in the generating instructions 105 from the unsigned designation to the signed designation.

The method 300 can also include the optional step 310 of modifying the signing identifier 110 by changing from a signed designation to a signed designation. (e.g. based on a decision of the registrant 12 and/or registrar 16). Step 310 can include a receipt module (e.g. the record selection module 200) for receiving a request to change the signing identifier 110 and for facilitating the changing of the signing identifier 110 in the generating instructions 105 from the signed designation to the unsigned designation.

The changing can be implemented by (e.g. an administrator of the DNS publication service 22): inhibiting the transmission of the set of DNS records 34 (e.g. disabling operation of the publication module 202b); provisioning a new set of generation instructions 105 to include the signed/unsigned designation change (e.g. signed to unsigned or unsigned to signed); and reenabling the transmission of the set of DNS records 34 (reestablishing operation of the publication module 202a).

Once the signing identifier 110 change has been accomplished, (i.e. the generation instructions 105 have been provisioned to incorporate the identifier change), the step 306 of the distribution system 202 can be further triggered to: obtain a further instance of the selected data of the registry data 23; and send the further instance to the DNSSEC signing system 204 in order for the further instance of the registry data to be used to generate a further signed DNS record using the at least one signing module 204b (e.g. changing the selected data in the DNS data 34 to signed what was previously unsigned). For example, this alternative embodiment can be implemented for one or more resource record types 26c.

Alternatively, once the signing identifier 110 change has been accomplished, (i.e. the generation instructions 105 have been provisioned to incorporate the identifier change), the step 306 of the distribution system 202 can be further triggered to: obtain a further instance of the selected data of the registry data 23; and bypass sending of the further instance to the DNSSEC signing system 204 in order for the further instance of the registry data to be used to generate a further unsigned DNS record by bypassing the at least one signing module 204b (e.g. changing the selected data in the DNS data 34 to unsigned what was previously signed). For example, this alternative embodiment can be implemented for one or more resource record types 26c.

Finally, the further set of DNS records 34 is published in the DNS 30 by sending the further set of DNS records 34 to the one or more authoritative servers 32 of the DNS 30 by the DNS publication system 22, the further set of DNS records including the further signed (or unsigned) DNS record. (republishing the previous selected data as now changed to signed or unsigned). Accordingly, the DNS publication system 22, with the option to use or not use the signing system 204, and further with the option to use or not use the signing module 204b, can be utilized flexibly as a gateway by the registry operator 20 (or in connection with the registrant 12 and/or the registrar 16) to provide (and to straightforwardly change) signed records to unsigned records (of the DNS data 34) or unsigned records to signed records (of the DNS data 34) on a per domain basis. Accordingly, the DNS publication system 22, with the option to use or not use the signing system 204, and further with the option to use or not use the signing module 204b, can be utilized flexibly as a gateway by the registry operator 20 (or in connection with the registrant 12 and/or the registrar 16) to provide (and to straightforwardly change) signed records to unsigned records (of the DNS data 34) or unsigned records to signed records (of the DNS data 34) on a per resource record type 26c basis for the domain of the domain name 14.

Figure 5:
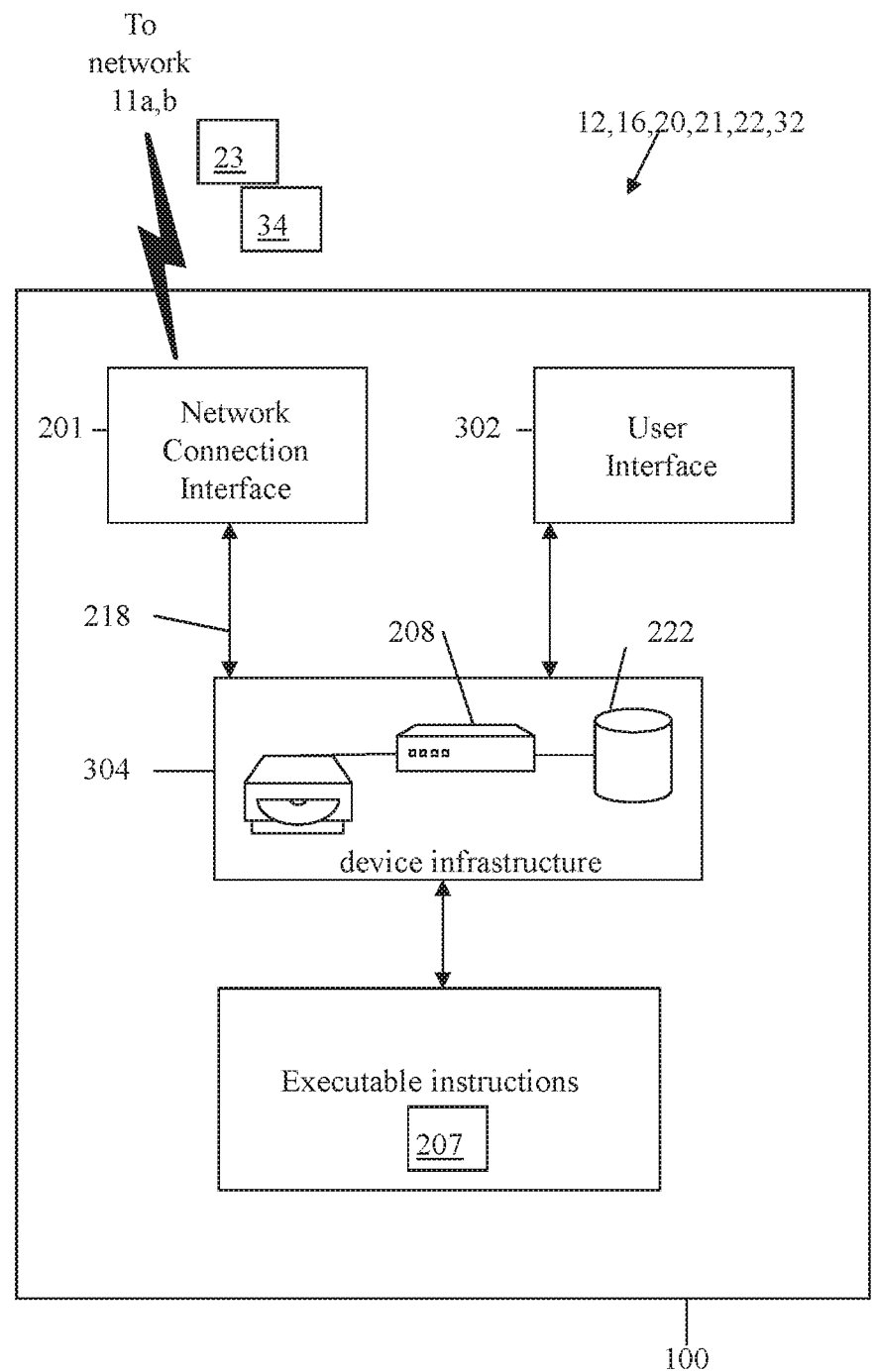
FIG. 5 is an example block diagram of computing devices implementing one or more components of the system of FIG. 1.

Referring to FIG. 5, shown is such that operation of the device 100 is facilitated by the device infrastructure 304. The device infrastructure 304 includes one or more computer processors 208 and can include an associated memory 222 (e.g. database 18,19). The computer processor 208 facilitates performance of the device 100 configured for the intended task (e.g. of the respective module(s) 200, 202, 204) through operation of the network interface 201, the user interface 302 and other application programs/hardware of the device 100 by executing task related instructions. These task related instructions can be provided by an operating system, and/or software applications located in the memory 222, and/or by operability that is configured into the electronic/digital circuitry of the processor(s) 208 designed to perform the specific task(s). Further, it is recognized that the device infrastructure 304 can include a computer readable storage medium coupled to the processor 208 for providing instructions to the processor 208 and/or to load/update the instructions 207 (e.g. modules 200, 202, 204 and/or instructions 105, 105a). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 208 as used herein is a configured device and/or set of machine-readable instructions for performing operations as described by example above, including those operations as performed by any or all of the modules. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the modules may be implemented in hardware, software or a combination of both. Accordingly, the use of a processor 208 as a device and/or as a set of machine-readable instructions is hereafter referred to generically as a processor/module 208 for sake of simplicity.

It will be understood in view of the above that the computing devices 100 may be, although depicted as a single computer system, may be implemented as a network of computer processors, as desired.

What is claimed is:

1. A system for publishing a plurality of Domain Name System (DNS) records for a domain name, the system comprising:
a record selection module for obtaining selected data of registry data associated with the domain name stored in a registry database, the registry database containing the registry data as a plurality of registry objects pertinent to creation and maintaining of the domain name, the selected data for use in populating selected DNS records;
a DNS Security (DNSSEC) signing system having at least one signing module for digitally signing the selected data of the registry data, said digitally signing using one or more signing keys (SK) to generate a signed DNS record, the one or more signing keys associated with the registry data of the domain name;
a distribution system for coordinating the publishing of a set of DNS records for storage in the DNS by facilitating transmitting of the set of DNS records to one or more authoritative servers of the DNS in a transmission path that bypasses storing of the signed DNS record in the registry database, the set of DNS records generated based on a signing identifier on how to generate the set of DNS records by either:
a) sending the selected data to the DNSSEC signing system for subsequent direct inclusion as the signed DNS record in the set of DNS records by the DNSSEC signing system using a set of generation instructions; or
b) including the selected data as an unsigned DNS record in the set of DNS records by the distribution system using the set of generation instructions, wherein the transmission path also bypasses the at least one signing module of the DNSSEC signing system.

2. The system of claim 1, wherein the unsigned DNS record is a Name Server (NS) record.

3. The system of claim 1, wherein the signed DNS record is a Delegation Signer (DS) record.

4. The system according to claim 1, wherein the set of DNS records with the signed DNS record also includes a public key of the one or more signing keys as a DNSKEY record.

5. The system of claim 1, wherein the signing identifier is included in the set of generation instructions.

6. The system of claim 1, wherein the distribution system consults the signing identifier before said sending of the selected data to the DNSSEC signing system.

7. The system of claim 6, wherein the distribution system generates a checklist for separating the selected data into a first portion of the registry data and a second portion of the registry data, the first portion of the registry data for inclusion in the set of DNS records as unsigned records and the second portion of the registry data for inclusion in the set of DNS records as signed records, the distribution system sending the checklist with the selected data to the DNSSEC signing system.

8. The system of claim 7, wherein the DNSSEC signing system incorporates the first portion of the registry data in the set of DNS records in a path that bypasses the at least one signing module and incorporates the second portion of the registry data in the set of DNS records using one or more digital signatures as obtained from the at least one signing module.

9. The system of claim 6, wherein the DNSSEC signing system generates a checklist for separating the selected data into a first portion of the registry data and a second portion of the registry data, the first portion of the registry data for inclusion in the set of DNS records as unsigned records and the second portion of the registry data for inclusion in the set of DNS records as signed records.

10. The system of claim 9, wherein the DNSSEC signing system incorporates the first portion of the registry data in the set of DNS records in a path that bypasses the at least one signing module and incorporates the second portion of the registry data in the set of DNS records using one or more digital signatures as obtained from the at least one signing module.

11. The system of claim 1, wherein the distribution system further includes a publication module for implementing said sending of the set of DNS records.

12. The system of claim 1, wherein the DNSSEC signing system further includes a publication module for implementing said sending of the set of DNS records.

13. The system of claim 1, wherein the distribution system further includes a DNS record module for generating the set of DNS records to incorporate the selected data using the set of generation instructions.

14. The system of claim 1, wherein the DNSSEC signing system further includes a DNS record module for generating the set of DNS records using the set of generation instructions to incorporate the selected data and one or more signatures obtained from said digitally signing.

15. The system of claim 1, wherein the signing identifier is a presence of a DNSSEC record in the set of generating instructions used to generate the set of DNS records, the DNSSEC record for containing the signed DNS record when generated by the at least one signing module.

16. The system of claim 6, wherein the signed DNS record is a Resource Record Signature record (RRSIG).

17. A system for publishing a plurality of Domain Name System (DNS) records for a domain name, the system comprising:
a record selection module for obtaining selected data of registry data associated with the domain name stored in a registry database;
a DNS Security (DNSSEC) signing system having at least one signing module for digitally signing the selected data of the registry data, said digitally signing using one or more signing keys (SK) to generate a signed DNS record, the one or more signing keys associated with the registry data of the domain name;
a distribution system for coordinating the publishing of a set of DNS in the DNS by facilitating transmitting of the set of DNS records to one or more authoritative servers of the DNS in a transmission path that bypasses storing of the signed DNS record in the registry database, the set of DNS records generated based on a signing identifier on how to generate the set of DNS records by either:
a) sending the selected data to the DNSSEC signing system for subsequent direct inclusion as the signed DNS record in the set of DNS records by the DNSSEC signing system using a set of generation instructions; or
b) including the selected data as an unsigned DNS record in the set of DNS records by the distribution system using the set of generation instructions, wherein the transmission path also bypasses the at least one signing module of the DNSSEC signing system, wherein the signing identifier is modified by changing from an unsigned designation to a signed designation.

18. The system of claim 17 further comprising a receipt module for receiving a request to change the signing identifier and for facilitating said changing the signing identifier from the unsigned designation to the signed designation.

19. The system of claim 17, wherein said changing is implemented by:
a) inhibiting the transmission of the set of DNS records;
b) provisioning a new set of generation instructions to include the signed designation; and
c) reenabling the transmission of the set of DNS records.

20. The system of claim 18, wherein the receipt module is the record selection module.

21. The system of claim 17, wherein the distribution system is further triggered to:
obtain a further instance of the selected data; and
send the further instance to the DNSSEC signing system in order for the further instance to be used to generate a further signed DNS record using the at least one signing module.

22. The system of claim 21, wherein the further set of DNS records is published in the DNS by sending the further set of DNS records to the one or more authoritative servers of the DNS, the further set of DNS records including the further signed DNS record.

23. The system of claim 1, wherein the registry database has the domain name as one of a plurality of domain names operated by a registry hosing the registry database.

24. The system of claim 1, wherein the signing identifier is modified by changing from an unsigned designation to a signed designation.

* * * * *